(No Model.)
F. J. GARNIER & N. CURÉ.
PIPE JOINT.
No. 390,770. Patented Oct. 9, 1888.
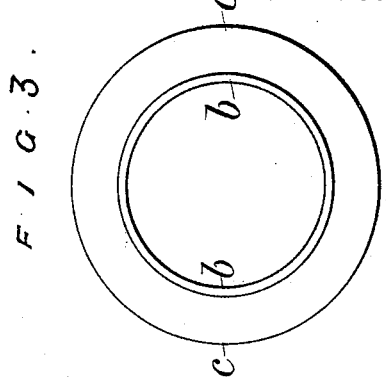
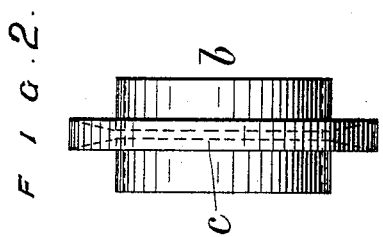
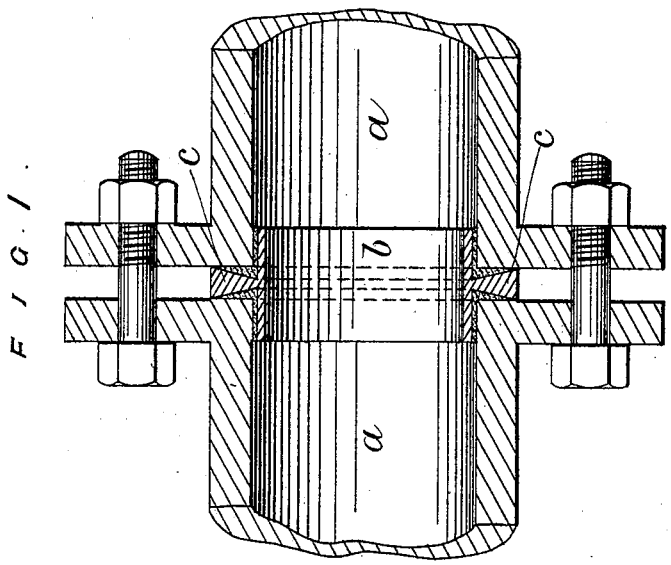
Witnesses:
Edgar Tate.
J. M. Ritter.
Inventors,
F. J. Garnier & N. Curé.
By Munn & Co
Attorneys.

UNITED STATES PATENT OFFICE.

FRANÇOIS JOS. GARNIER AND NICOLAS CURÉ, OF BRUSSELS, BELGIUM.

PIPE-JOINT.

SPECIFICATION forming part of Letters Patent No. 390,770, dated October 9, 1888.

Application filed December 13, 1887. Serial No. 257,772. (No model.) Patented in Belgium February 19, 1887, No. 76,421; in Germany May 15, 1887, No. 42,060; in France August 18, 1887, No. 185,386; in England October 3, 1887, No. 13,380; in Italy February 17, 1888, No. 23,019, and in Spain February 20, 1888, No. 7,933.

*To all whom it may concern:*

Be it known that we, FRANÇOIS JOSEPH GARNIER and NICOLAS CURÉ, both at present residing at 216 Rue du Progrès, Schaerbeek, Brussels, in the Kingdom of Belgium, have invented a new and useful Improved Pipe-Joint, (which has been patented in Great Britain, dated October 3, 1887, No. 13,380; in Belgium, dated February 19, 1887, No. 76,421; in Germany, dated May 15, 1887, No. 42,060; in France, dated August 18, 1887, No. 185,386; in Italy, dated February 17, 1888, No. 23,019, and in Spain, dated February 20, 1888, No. 7,933,) of which the following is a full, clear, and exact description.

This invention relates to an improved pipe-joint whereby a perfectly-tight joint may be obtained without liability of leakage; and it consists in the particular construction and combination of parts, as hereinafter fully described, and pointed out in the claim.

Reference is to be had to the accompanying drawings, forming part of this specification, wherein—

Figure 1 is a longitudinal section through the pipe-joint. Fig. 2 is an edge and Fig. 3 a face view of the flanged thimble separately.

The same letters of reference indicate the same parts in all the figures.

$a\ a$ are the ends of the pipe to be coupled.

$b$ is the ferrule or short tube or ring, of cast-iron or other metal, corresponding in form to the sectional form of the pipes and fitting easily in the bore thereof, so as to leave space between the ferrule and the pipe for the packing.

$c$ is an external circumferential flange at the middle of the length of the ferrule and cast in one therewith. It is of dovetailed or equivalent undercut form in cross-section, as shown in Fig. 1, and it comes between the faces of the flanged ends of the pipes, which are drawn together tightly against the external thicker portion of the flange $c$ by bolts and nuts, as shown, thus imprisoning the packing of red lead, tow, or other plastic or fibrous material in the space between the flange and the pipe ends, and between the circumference of the thimble and the bore of the pipe.

Having now particularly described and ascertained the nature of the said invention and in what manner the same is to be performed, we declare that what we claim is—

The combination, with the plain flanged ends of two pipes connected by screw-bolts, of a thimble or short tube or ring having an external flange of dovetailed or undercut form in cross-section, the thimble fitting loosely in the bore of the pipes, and the flange intervening between the abutting flanged pipe ends and a soft packing lodged between the undercut faces of the flange and the pipe ends, substantially as herein shown and described.

The foregoing specification of our improved pipe-joint signed by us this fifth (5th) day of October, 1887.

F. JOS. GARNIER.
      N. CURÉ.

Witnesses:
  T. B. VANDERGHEYNS,
86 *Rue Ribeaucourt, Comptable à Molenbeek St. Jean lez Bruxelles.*
  A. DE BACKER,
347 *Rue du Progrès, Agent Commercial à Schaerbeek lez Bruxelles.*